Figure 1:
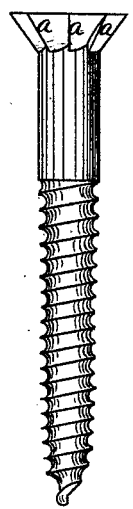

C. C. DOTEN.
Screw.

No. 213,551.　　　　Patented Mar. 25, 1879.

WITNESSES　　　　INVENTOR.

UNITED STATES PATENT OFFICE.

CHARLES C. DOTEN, OF PLYMOUTH, MASSACHUSETTS.

IMPROVEMENT IN SCREWS.

Specification forming part of Letters Patent No. 213,551, dated March 25, 1879; application filed February 25, 1878.

*To all whom it may concern:*

Be it known that I, CHARLES C. DOTEN, of Plymouth, in the State of Massachusetts, have invented certain Improvements in Screws, of which the following is a specification:

This invention relates to a certain construction of the head of the screw to adapt it to act as a reamer, and make a place for itself in the material into which it is to be driven, so that the head may be flush with the surface of the material in which the screw is used.

I accomplish the object sought by making the screw with small cutting or rasping surfaces on the under face of the head, extending from the barrel or smooth portion of the screw to the top periphery of the head, the cutting-flanges being greater at the bottom and decreasing toward the top, where it disappears.

In the drawings, six such cutting or rasping surfaces are shown; but I do not limit myself to any particular number. More than that number may be advantageously used, and a less number might answer. Six would, however, be ordinarily the proper number. These cutting-surfaces all have their edges facing in the same direction—that is to say, in the direction in which they serve to cut away the wood when the screw is driven home.

In the manufacture of my screws I recommend the use of either solid or open dies, as now used in the manufacture of rivet and screw blanks, the part of the die which forms the under surface of the head being fitted with indentations of the form necessary to make the cutting-surfaces on the under side of the screw-head; but I do not confine myself to such method, as the invention may be made use of by other methods by an ordinarily-skilled mechanic.

The operation of a screw constructed in accordance with my invention is as follows: A hole is made for the screw in the ordinary way, and when the screw has been driven in up to the head the cutting or rasping surfaces above mentioned cut or rasp away the material into which the screw is driven, so as to ream out a space for the head. By the use of this screw a reamer or any other implement for making a place for the head of the screw is rendered unnecessary, and the head of the screw cuts a place for itself. It will be found that this result is attained with ease, and that screws thus constructed may be driven with much greater rapidity and less labor than when they are constructed in the ordinary way, and driven by the method now made use of.

Figure 2:
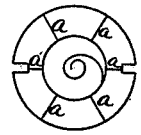

In the drawings, Figure 1 is a plan of a screw constructed as above described, and Fig. 2 is a view of the under surface of such a screw.

*a a a* are the cutting surfaces or edges.

I am aware that screws have been made with grooves or flanges, similar in shape to those described by me, on the under side of the head. They, however, face in the opposite direction to mine, and accomplish a different result. They act not to ream out a seat for the head, but simply serve as ratchet-teeth to prevent the withdrawal of the screw after it has been inserted in the wood, the countersink for the screw-head being made by a reaming-tool, in the ordinary way.

What I claim, and desire to secure by Letters Patent, is—

The herein-described screw, having on the under side of the head grooves or cutting-flanges of the character shown and specified, arranged to form a seat for the screw-head by the turning of the screw in driving it home, the said flanges extending from the barrel or smooth portion of the screw to the top periphery or rim of the screw-head, and being largest at the bottom and gradually decreasing to the top, where they disappear, substantially as set forth.

CHARLES C. DOTEN.

Witnesses:
 CHAS. H. SWAN,
 CHAS. S. C. DREW.